United States Patent [19]

Isherwood et al.

[11] 4,131,574

[45] Dec. 26, 1978

[54] STARCH

[75] Inventors: Harold Isherwood, Bewdley; John T. Shaw, Brierley Hill, both of England

[73] Assignee: British Industrial Plastics Ltd., Manchester, England

[21] Appl. No.: 813,556

[22] Filed: Jul. 7, 1977

[30] Foreign Application Priority Data

Jul. 9, 1976 [GB] United Kingdom ............... 28588/76

[51] Int. Cl.$^2$ ............................ C08L 3/02; C08L 3/10
[52] U.S. Cl. ..................................................... 260/17.3
[58] Field of Search ........................................ 260/17.3

[56] References Cited

U.S. PATENT DOCUMENTS

| | | | |
|---|---|---|---|
| 2,317,752 | 4/1943 | Fuller | 536/105 |
| 2,450,377 | 9/1948 | Kesler et al. | 260/17.3 |
| 3,211,564 | 10/1965 | Lauterbach | 536/105 |
| 3,255,040 | 6/1966 | Huber et al. | 536/105 |
| 3,475,215 | 10/1969 | Maurer | 106/214 |
| 3,539,366 | 11/1970 | Ewing | 536/105 |
| 3,836,376 | 9/1974 | Hampton et al. | 260/17.3 |
| 3,973,985 | 8/1976 | Voigt et al. | 106/214 |
| 4,040,862 | 8/1977 | Voigt et al. | 536/105 |

*Primary Examiner*—Edward M. Woodberry
*Attorney, Agent, or Firm*—William Anthony Drucker

[57] ABSTRACT

A method for the manufacture of a starch solution in which, in the thermochemical conversion of starch using oxidizing agent and mechanical shear on the starch slurry at 110° C to 180° C, an amino-formaldehyde resin is added to the starch slurry before subjecting it to the mechanical shear.

4 Claims, No Drawings

STARCH

This invention relates to starch and, in particular, to a thermochemically converted starch.

In the manufacture of paper starch is used for various purposes including sizing, to improve surface quality, to improve the quality on subsequent coating. It is also added to the body of the paper to improve internal bonding, for stiffening as in the manufacture of corrugated paper products. Starch is also used in glues for subsequent paper treatments.

Raw starch can be swollen and obtained as a colloidal aqueous solution but for use in commercial processing the viscosity of the solution at low solids contents is too high for acceptable concentrations to be used and the stability of the solution is poor.

Thus a number of methods are in use for converting or modifying the starch in order to lower the viscosity of its solution and enable higher concentrations to be used and to improve its stability.

These methods include pre-treatments of the starch such as oxidation, enzyme conversion, esterification and etherification. By these methods good starch properties can be obtained, but the expense is considerable, so that starch pre-treated in this way costs considerably more than raw starch.

Two methods have therefore been evolved to modify the starch in a less expensive manner. Thermomechanical conversion involves subjecting a starch slurry to a high temperature and mechanical shear, e.g. by injection of live steam at high pressure. This method can produce an acceptable viscosity starch solution at 8% solids content but its stability is not good.

Thermochemical conversion of the starch involves adding, for example, oxidising agent to the starch slurry which is treated in a similar way as in thermomechanical conversion. This method enables acceptable viscosities to be obtained at higher starch concentrations but the stability of them is not good.

The stability of the starch solution is its ability to retain a low viscosity during storage. Both converted and raw starches form solutions which have a tendency to increase irreversibly in viscosity as they cool e.g. to below 50° C. so that subsequent heating of the solution does not restore its original viscosity. This phenomenon is usually referred to as starch "set-back" in the industry.

It is desirable for the storage stability of a starch solution to be at least 2 days for commercial use. Increased solution concentrations decrease storage stability.

The present invention provides a method for the manufacture of starch solution which comprises the steps of forming a slurry of substantially raw starch in water, adding to said slurry an amino formaldehyde resin, and oxidising agent, and subjecting said slurry to mechanical shear at a temperature in the range 110° C. to 180° C.

We have found that addition of the resin to completely raw starch in this way, before thermochemical conversion, results in a starch solution which retains a low viscosity at relatively high solids content, and has enhanced stability.

It is to be appreciated that thermochemical conversion may be carried out on a starch which is not completely raw, i.e. on which some partial conversion has already been carried out. With such starches the method of the invention can still be used although the advantages thereby obtained may not be wholly the same as with completely raw starch.

The invention also provides a starch solution comprising a starch and amino-formaldehyde resin manufactured by the method described above.

The amino-formaldehyde resin is preferably urea-formaldehyde resin of known type, with a low degree of condensation, i.e. a resin with good water dilutability and preferably also a low level of free formaldehyde e.g. not more than 1.5% on weight of resin. The ratio of urea to formaldehyde is preferably in the range 1:1.1 up to 1:2.5.

The oxidising agent is preferably hydrogen peroxide although other oxidising agents such as Sodium or Potassium persulphate may also be used. With such oxidising agents a catalyst is generally used to promote reaction of the oxidising agent with the starch, a particularly suitable catalyst being Copper Sulphate ($CuSO_4 5H_2O$). The amount of catalyst used is small e.g. 50 to 250 ppm (on dry starch) and is usually added direct to the starch slurry.

The slurry is preferably subjected to mechanical shear at an elevated temperature by means of injection of live steam into the slurry at sufficiently high pressure to obtain reaction temperature, in a thermochemical starch converter, which may be of any of the known types. For example the pressure in the converting head may be 2 to 6 $Kgf/cm^2$.

If desired an alkali may be added to the starch solution after subjection to shear and temperature to adjust the pH of the solution, and also other additives may be added where required.

The amount of resin added to the starch slurry may be up to 30% by weight of the total weight of dry starch in the slurry. The actual amount used will generally be less than 30%, for example in the range 2% to 15% and is dependent also upon the efficiency of the converter.

The amount of oxidising agent used may be the same as in a conventional thermochemical starch conversion. It will generally be in the approximate range 1 to 3 percent by weight of oxidising agent based on the weight of starch solids but the actual amount is varied according to the actual converter. If the oxidising agent and resin are simply added to a slurry of starch, the resulting slurry is liable to react before it has all been passed to the converter and so not be convertible. It is therefore preferred to add at least either the oxidising agent or the resin to the slurry only as it is passing to the converter i.e. immediately before it is to be subjected to heat and shear. More preferably both resin and oxidising agent are so treated and added individually as the slurry is passing to the converter.

Starch solutions prepared by the method of this invention may be used to improve the properties of paper in the usual way. Thus the solutions may be employed in treatment of the paper during manufacture e.g. by application at the size press on a conventional paper-making machine.

The invention will now be described in more detail by means of an example.

To a slurry of raw starch of 24% dry starch content also containing 100 ppm of $CuSO_4 5H_2O$ on dry starch was added 10%, by weight of the total weight of dry starch, of a urea-formaldehyde resin in which the molar ratio of urea to combined formaldehyde was 1:1.6.

The slurry was passed through a thermochemical converter at a rate of 2600 liters/hour, together with dilution water (745 liters/hour), and aqueous Hydrogen peroxide solution of 3.5% concentration (wt/vol) (80 liters/hour).

Live steam was injected into the slurry in the converter, the pressure in the converter being 4–5 Kgf/cm$^2$, and the dwell time of starch in the converter, i.e. the time during which the starch was subject to conversion conditions during its passage through the converter, was approx. 50 seconds.

Water was added to the solution passing from the converter at a rate of 1640 liters/hour, and aqueous sodium hydroxide solution of 3.5% (wt/vol) concentration (45 liters/hour).

The final starch solution has a solids content of 15% of which 13.8% was starch and 1.2% resin.

The viscosity of the solution at 78° C. was 26 cp.

The viscosity at 78° C. of a 15% solids starch solution made in the same way but omitting the resin was 20 cp.

It was found that the stability of the resin-containing starch solution was very good, the irreversible gelation, usual for a non-resin-containing starch solution, did not occur when the resin-containing starch solution was cooled below 50° C. The viscosity of the resin containing solution remained acceptable after 2–3 days whereas the starch solution not containing the resin becomes unacceptable within 12 hours when allowed to cool below 50° C.

In subsequent testing based on this Example on a larger scale we have found that the slurries of raw starch containing copper sulphate and the urea-formaldehyde resin become less readily converted upon storage e.g. over a 12 hour period. Thus it is preferable to individually meter both the hydrogen peroxide and the resin into the slurry as it is fed to the converter.

It is to be noted that addition of amino-formaldehyde resins to thermochemically converted starch has been previously proposed, but only after the thermochemical conversion, when it was found that the stability of the starch solution was reduced. Since the resin is a polyfunctional compound it may be expected that when the resin is added before thermochemical conversion of the starch co-reaction with the starch would result in a higher viscosity in the final product. In practice we have now found that only minor viscosity difference from thermochemically converted starch solution not containing the resin occurs whilst significant improvement in resistance to viscosity change on storage is obtained.

What we claim is:

1. In a process for the manufacture of starch solution which comprises forming a slurry of substantially raw starch in water; adding to the slurry a conventional starch oxidising agent; and subjecting the slurry, in the presence of the oxidising agent, to mechanical shear at elevated temperature in the range of about 110° to about 180° C., the improvement which consists in adding to the slurry, before the slurry is subjected to mechanical shear at elevated temperature, an amino-formaldehyde resin in an amount forming from about 2 to about 30% by weight of the total weight of dry starch in the slurry.

2. A process according to claim 1, wherein the amino-formaldehyde resin is a urea-formaldehyde resin.

3. A process according to claim 2, wherein the molar ratio of urea to formaldehyde in the resin is in the range 1:1.3 to 1:2.5.

4. A process according to claim 1, wherein the amount of resin is in the range 2 to 15% by weight of the total weight of dry starch in the slurry.

* * * * *